US010221911B2

(12) United States Patent
Sikora et al.

(10) Patent No.: US 10,221,911 B2
(45) Date of Patent: Mar. 5, 2019

(54) TWIN-TUBE HYDRAULIC DAMPER WITH A VIBRATION SUPPRESSING DEVICE

(71) Applicant: BeijingWest Industries Co., Ltd., Beijing (CN)

(72) Inventors: Marian Sikora, Crakow (PL); Witold Palka, Crakow (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 15/615,787

(22) Filed: Jun. 6, 2017

(65) Prior Publication Data

US 2018/0023654 A1 Jan. 25, 2018

Related U.S. Application Data

(60) Provisional application No. 62/364,000, filed on Jul. 19, 2016.

(51) Int. Cl.
*F16F 9/06* (2006.01)
*F16F 9/18* (2006.01)
(Continued)

(52) U.S. Cl.
CPC .............. *F16F 9/341* (2013.01); *F16F 9/067* (2013.01); *F16F 9/185* (2013.01); *F16F 9/3257* (2013.01); *F16F 9/348* (2013.01); *F16F 9/3485* (2013.01)

(58) Field of Classification Search
CPC .......... F16F 9/341; F16F 9/067; F16F 9/3485; F16F 9/3257; F16F 9/348; F16F 9/185
(Continued)

(56) References Cited

U.S. PATENT DOCUMENTS

| 4,423,800 A | 1/1984 | Kobiske |
| 5,042,624 A * | 8/1991 | Furuya ................... F16F 9/348 |
| | | 188/280 |

(Continued)

FOREIGN PATENT DOCUMENTS

| CN | 101619753 A | 7/2009 |
| CN | 101571176 A | 11/2009 |

(Continued)

OTHER PUBLICATIONS

Extended European Search Report dated Dec. 15, 2017 (8 Pages).
First Office Action and Search Report dated Sep. 28, 2018, for counterpart Chinese Patent Application No. 201710437883.6.

*Primary Examiner* — Pamela Rodriguez
(74) *Attorney, Agent, or Firm* — William H. Honaker; Dickinson Wright PLLC

(57) ABSTRACT

A twin-tube hydraulic damper assembly includes a main tube having an internal radius extending along a center axis between a first end and a second end. An external tube is disposed on the center axis extending about the main tube. A base valve attached to the second end for controlling the flow of the working liquid during the compression stroke and the rebound stroke. A rebound valve of at least one rebound deflective disc having a thickness is disposed in the compression chamber and adjacent to the body. The rebound deflective disc has an external circumferential surface spaced from the main tube defining an annular damping gap extending about the center axis and having a radial width whereby a ratio of said radial width of the annular damping gap to the internal radius is less than 10%.

18 Claims, 3 Drawing Sheets

(51) Int. Cl.
*F16F 9/32* (2006.01)
*F16F 9/34* (2006.01)
*F16F 9/348* (2006.01)

(58) Field of Classification Search
USPC .... 188/322.14, 266, 322.13, 322.16, 322.19, 188/297, 314, 315; 267/64.11, 64.15, 267/64.26
See application file for complete search history.

(56) References Cited

U.S. PATENT DOCUMENTS

| | | | | | |
|---|---|---|---|---|---|
| 5,150,775 | A | * | 9/1992 | Charles | B60G 17/08 188/266.3 |
| 5,325,942 | A | * | 7/1994 | Groves | F16F 9/3484 188/282.6 |
| 5,630,485 | A | * | 5/1997 | Beck | F16F 9/3242 137/493.8 |
| 6,886,670 | B2 | * | 5/2005 | Holiviers | F16F 9/3214 188/322.14 |
| 7,240,776 | B2 | * | 7/2007 | Murata | F16F 9/3207 188/322.14 |
| 8,342,303 | B2 | * | 1/2013 | Maeda | F16F 9/3485 137/854 |
| 8,616,351 | B2 | * | 12/2013 | Roessle | F16F 9/348 188/266.5 |

FOREIGN PATENT DOCUMENTS

| | | |
|---|---|---|
| CN | 202023876 U | 11/2011 |
| DE | 2727407 A1 | 4/1979 |
| DE | 3202721 A1 | 8/1983 |
| DE | 102007054561 A1 | 5/2009 |
| DE | 102008042251 B3 | 4/2010 |
| FR | 2563882 A1 | 11/1985 |
| FR | 2661726 A1 | 8/1991 |
| FR | 2866688 A1 | 2/2005 |
| GB | 2347728 A | 9/2000 |
| JP | 55-102440 | 1/1954 |
| JP | 6078127 | 5/1985 |
| JP | 10220515 | 8/1998 |

\* cited by examiner

TWIN-TUBE HYDRAULIC DAMPER WITH A VIBRATION SUPPRESSING DEVICE

CROSS REFERENCE TO RELATED APPLICATION

This application claims the benefit of provisional application Ser. No. 62/364,000 filed on Jul. 19, 2016, the contents of which are incorporated herein by reference in their entirety.

BACKGROUND OF THE INVENTION

1. Field of the Invention

The present invention relates to a twin-tube hydraulic damper.

2. Description of the Prior Art

Prior art references disclose solutions providing improvements of acoustic performance of hydraulic dampers. For example, Patent publication DE102008042251 discloses a noise suppression unit arranged on the piston rod formed by a cylindrical sleeve with a diameter lower than diameter of the piston, arranged on the piston compression side. That construction provides annular inertial flow channel between the outer surface of the sleeve and the inner surface of the damper tube. That additional working liquid flow path provides noise suppression effect by means of the liquid inertial force.

Patent publication JPH10-220515 in turn discloses a hydraulic buffer for noise reduction, in which an additional sloped disc is added on a rebound side of the piston assembly specifically in the inlet area of the axial channels. The inclination of said sloped disc provides a vortex flow of working liquid through said axial channels. The vortex flow suppress cavitation produced upstream of the axial channels and thereby reduces the fluid noise.

High frequency vibrations of a piston rod result in rattling (rambling, knocking) noise and if the damper is a part of a vehicle suspension system, these vibrations may be audible even in the passenger compartment. The rattling noise intensity and occurrence obviously depends on a vehicle suspension setup and an acoustic performance of a vehicle chassis. Nevertheless, it occurs mainly at low amplitude, high frequency damper stroke reversals, occurring for example while driving over the road paved with setts (also called Belgian blocks) with relatively low speed of around 20-40 km/h. The most irritating rattling noise occurs at the piston rod vibrations frequency within the range of 300-600 Hz. Poor isolation parameters of the vehicle chassis and the top mount at the end of the piston rod, as well as low level of a background noise related to low vehicle speed at which this rattling noise occurs additionally makes this noise hard to ignore.

The inventors discovered that these vibrations are generated by a deflective disc of a rebound base valve assembly due to pressure fluctuations occurring in particular during rapid changes of the stroke direction.

SUMMARY OF THE INVENTION

The present invention relates to a twin-tube hydraulic damper assembly. The assembly includes a main tube disposed on a center axis and defining a fluid chamber having an internal radius. The main tube extends along the center axis between a first end and a second end for containing a working liquid. A piston is slidably disposed in the fluid chamber and movable along the center axis dividing the fluid chamber into a compression chamber and a rebound chamber. An external tube is disposed on the center axis extending about the main tube defining a compensation chamber between the main tube and the external tube. A piston rod guide is attached to the first end of the main tube and the external tube to close the rebound chamber.

A piston rod extends along the center axis through the piston rod guide and attached to the piston for moving the piston along the center axis between a compression stroke and a rebound stroke. The compression stroke is defined as the piston moving away from the piston rod guide. The rebound stroke is defined as the piston moving toward the piston rod guide. A base valve is attached to the second end of the main tube and in communication with the fluid chamber and the compensation chamber for controlling the flow of the working liquid from the fluid chamber to the compensation chamber during the compression stroke and the rebound stroke.

The base valve includes a body defining at least one rebound flow channel and at least one compression flow channel extending through the body and spaced from one another allowing the working fluid to flow through the body during the rebound stroke and the compression stroke. A rebound valve of at least one rebound deflective disc, having a thickness and a circumference, is disposed on the center axis in the compression chamber and adjacent to the body to cover the at least one rebound flow channel. A compression valve of at least one compression deflective disc is disposed on the center axis in the compensation chamber and adjacent to the body to cover the at least one compression flow channel. The rebound deflective disc having an external circumferential surface, spaced from the main tube, defines an annular damping gap extending about the center axis and having a radial width between the external circumferential surface and the main tube whereby a ratio of the radial width of the annular damping gap to the internal radius of the main tube is less than 10%.

A thin annular film of the working liquid in the annular damping gap introduces additional damping force resulting from working liquid shear stresses. This in turn improves energy dissipation and reduces the amplitude and frequency of the disc oscillations which obviously muffles irritating rattling noise.

Preferably, the body of the base valve includes an annular protrusion disposed between the rebound deflective disc and the body for receiving the rebound deflective discs. The annular protrusion extends outwardly from the body spaced from the main tube and defining an annular space extending between the annular protrusion, the rebound deflective disc, and the body. The annular protrusion extends about the center axis and having a radial distance between the main tube and the annular protrusion.

Preferably, the ratio of the radial distance of the annular space to the internal radius of the main tube is less than 40%.

Preferably, the radial width of the annular damping gap is no more than 0.5 mm and less than the thickness of the rebound deflective disc.

No additional component of a damper is thus required to implement the present invention. Only the radius of the deflective disc needs to be appropriately enlarged.

In an alternative preferred embodiment, where increasing a diameter of the disc is not possible, the body of the base valve includes an internal annular projection disposed in the compression chamber adjacent to the main tube and extends radially outwardly from the body presenting a circumferential damping surface. The rebound deflective disc has an external circumferential surface spaced from the internal annular projection and is at least partially surrounded by the circumferential damping surface defining an annular damping gap extending about said center axis. The annular damping gap has a radial width between the external circumferential surface and the internal annular projection whereby a ratio of the radial width of the annular damping gap to the internal radius of the main tube is less than 10%.

Preferably the circumferential damping surface surrounds at least 30% of the circumference of the rebound deflective disc.

The invention in its broadest aspect provides for a twin-tube hydraulic damper in that significantly suppresses vibrations generated by a deflective disc of a rebound base valve assembly due to pressure fluctuations occurring in particular during rapid changes of the stroke direction thereby reducing rattling noises, which would be cost efficient and simple to manufacture.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
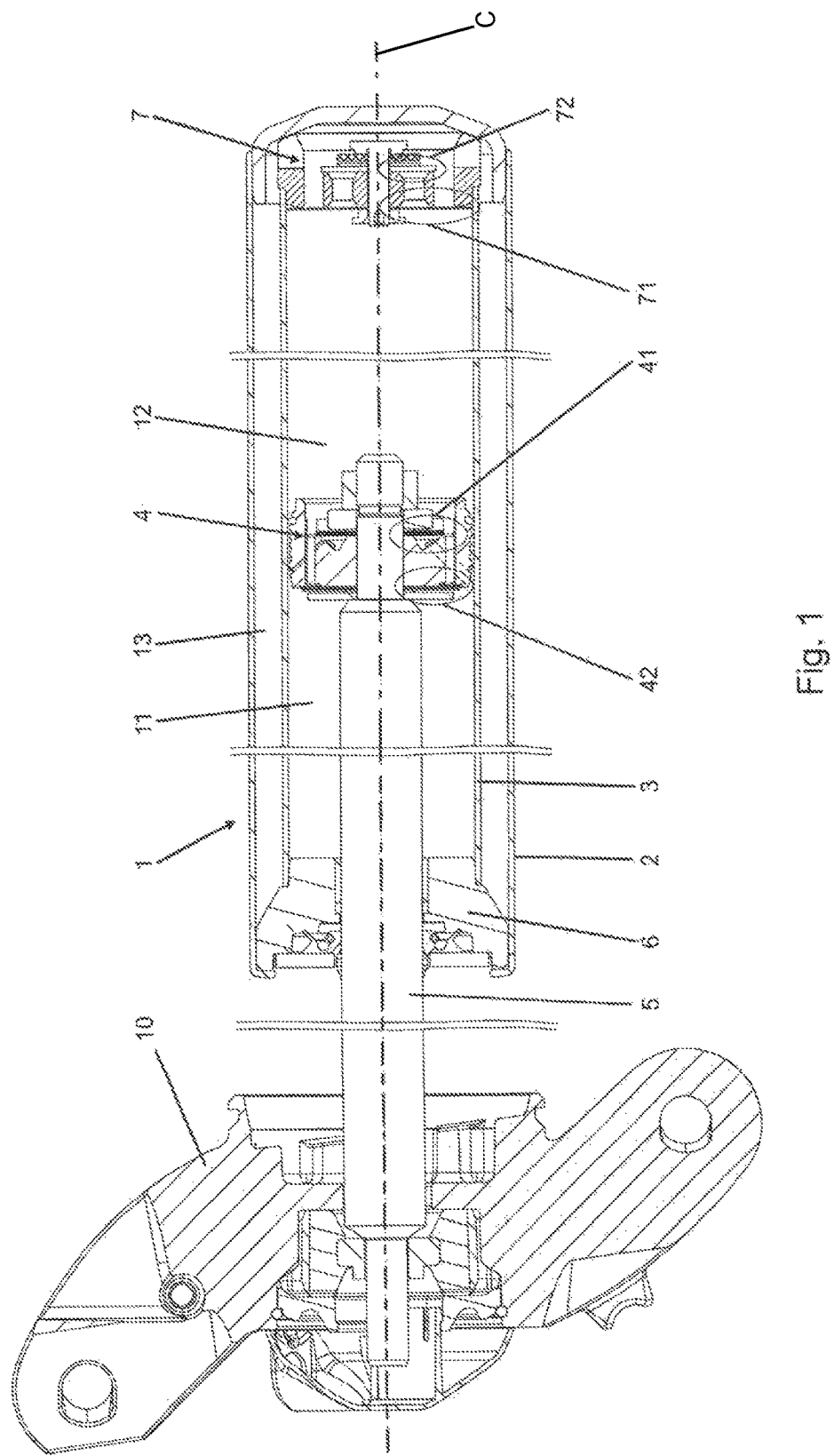
FIG. 1 is a cross-sectional perspective view of a twin-tube hydraulic damper according to the present invention.

Referring to the Figures, wherein like numerals indicate corresponding parts throughout the several views, a twin-tube hydraulic damper assembly 1 is generally shown in FIG. 1.

The twin-tube hydraulic damper assembly 1, as generally shown in FIG. 1, may be employed in a typical motor vehicle suspension. The assembly 1 includes a main tube 3 disposed on a center axis C and defining a fluid chamber 11, 12 having an internal radius $R_2$. The main tube 3 extends along the center axis C between a first end and a second end for containing a working liquid. A piston 4 is slidably disposed in the fluid chamber 11, 12 and movable along the center axis C. The piston 4 makes a sliding fit with the main tube 3 dividing the fluid chamber 11, 12 into a compression chamber 12 and a rebound chamber 11. The rebound chamber 11 extends between the first end of the main tube 3 and the piston 4. The compression chamber 12 extends between the second end of the main tube 3 and the piston 4. An external tube 2 is disposed on the center axis C extending about the main tube 3 defining a compensation chamber 13 between the main tube 3 and the external tube 2.

A piston rod guide 6 is attached to the first end of the main tube 3 and the external tube 2 to close the rebound chamber 11. A piston rod 5 extends along the center axis C through the piston rod guide 6. One end of the piston rod 5 is attached to the piston 4 and the other end of the piston rod 5 extends through the piston rod guide 6 and is fixed to a top mount 10. The piston rod 5 moves the piston 4 along the center axis C between a compression stroke and a rebound stroke. The compression stroke is defined as the piston 4 and the piston rod 5 moving axially and away from the piston rod guide 6. The rebound stroke is defined as the piston 4 and the piston rod 5 moving axially and toward the piston rod guide 6.

A base valve 7 is attached to the second end of the main tube 3 and in communication with the fluid chamber 11, 12 and the compensation chamber 13 for controlling the flow of the working liquid from the fluid chamber 11, 12 to the compensation chamber 13 during the compression stroke and the rebound stroke.

The piston 4 includes with a compression valve 42 and a rebound valve 41 to control the flow of working liquid through the piston 4 between the rebound chamber 11 and the compression chamber 12 while the piston 4 is in motion. The base valve 7 also includes a rebound valve 71 and a compression valve 72 to control the flow of working liquid through the base valve 7 between the compensation chamber 13 and the compression chamber 12, respectively, during the rebound stroke and the compression stroke.

Figure 3:
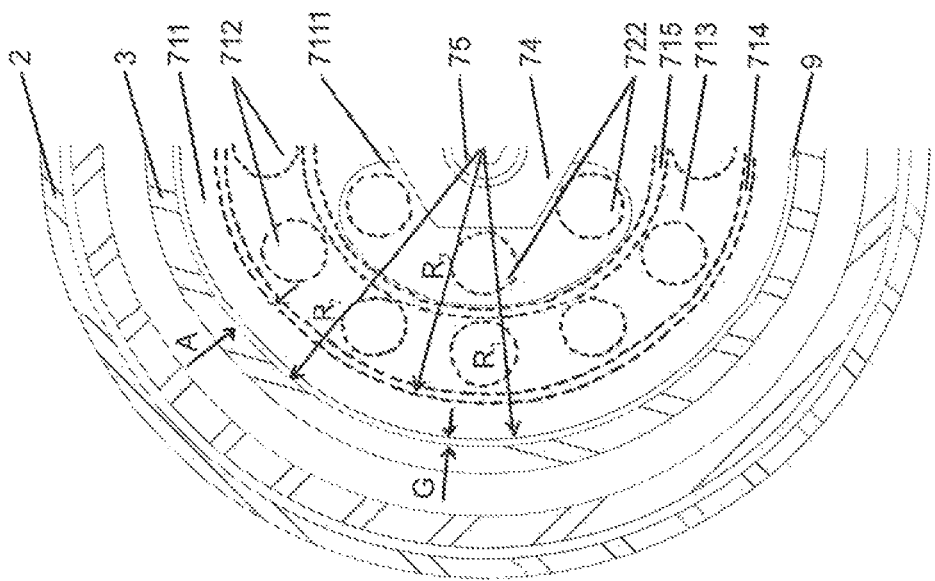
FIG. 3 is an enlarged cross-sectional view of the base valve assembly shown in FIG. 1 along the plane P-P shown in FIG. 2.
Figure 2:
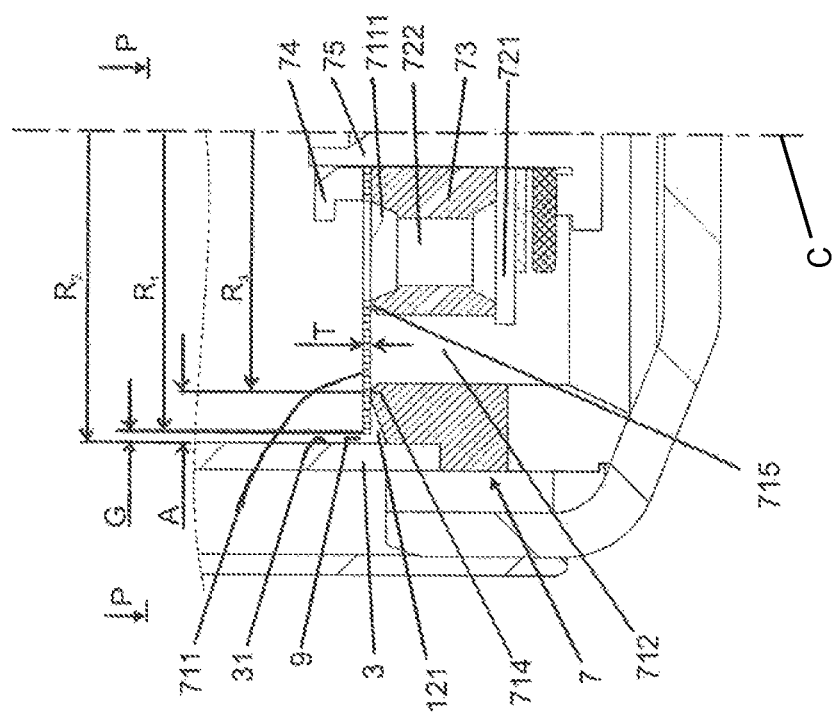
FIG. 2 is an enlarged axial cross-sectional view of the base valve assembly shown in FIG. 1.

As shown in FIGS. 2 and 3, the base valve 7 includes a body 73 defining at least one rebound flow channel 712 and at least one compression flow channel 722 extending through the body 73 and spaced from one another allowing the working fluid to flow through the body 73 during the rebound stroke and the compression stroke. It should be appreciated that the at least one rebound flow channel 712 may include a plurality of rebound flow channels 712 disposed about the center axis C and equiangularly spaced from one another. It should also be appreciated that the least one compression flow channel 722 may include a plurality of compression flow channels 722 disposed about the center axis C and spaced from the rebound flow channels 712 and one another.

The compression valve 72 may include a stack of the compression deflective discs 721 covering the compression flow channels 722 formed in a body 73 of the base valve 7. The rebound valve 71 includes at least one rebound deflective disc 711 covering a plurality of equiangularly spaced rebound flow channels 712 formed in the body 73 which are radially spaced from the compression flow channels 722. It should be appreciated that the rebound valve 71 may include only one rebound deflective disc 711. Radially internal areas of the rebound deflective disc 711 and the compression deflective discs 721 are clamped together by a bolt 75 passing through a central opening of the body 73 and secured in the compression chamber 12 by a threaded shoulder nut 74 screwed on an external thread of the bolt 75.

In order to provide an inflow of the working liquid to the compression flow channels 722 to deflect the compression deflective discs 721 during the compression stroke, the rebound deflective disc 711 of the rebound valve 71 is provided with a pair of openings 7111 with each of the opening 7111 having a kidney-shape in the area of the compression flow channels 722 and in communication with the compression flow channels 722 allowing the working fluid to flow through the rebound valve 71.

At the outlets of the rebound flow channels 712 an annular recessed seat 713 is formed in the body 73 enabling for a fluid communication between the rebound flow channels 712 and the rebound chamber 11 while covered by the rebound deflective disc 711 and equalizing the pressure of the working liquid acting on the rebound deflective disc 711 during the rebound stroke. The seat 713 is surrounded at its radially external side by an annular protrusion 714 and at its radially internal side by an annular protrusion 715. Therefore, an annular space 121 is defined between the radially external side of the external annular protrusion 714, the rebound deflective disc 711, and an internal surface 31 of the main tube 3. The annular space also has a radial distance A between the main tube 3 and the annular protrusion 714.

In order to introduce an additional damping force resulting from working liquid shear stresses, a thin annular damping gap 9 is defined between an external circumferential surface of the rebound deflective disc 711 and the internal surface 31 of the main tube 3. The external circumferential surface of the rebound deflective disc 711 is spaced from the internal surface 31 of the main tube 3 defining an annular damping gap 9 extending about the center axis C. The annular damping gap has a radial width G between the external circumferential surface and the main tube 3 whereby a ratio of the radial width G of the annular damping gap 9 to the internal radius $R_2$ of the main tube 3 is less than 10%.

In this embodiment, the radius $R_1$ of the rebound deflective disc 711 amounts to approximately 12 mm, the internal radius $R_2$ of the main tube 3 amounts to approximately 12.06 mm and the radius $R_3$ of the external annular protrusion 714 amounts to approximately 10 mm.

Therefore, the radial width, $G=R_2-R_1$, of the annular damping gap 9 amounts to approximately 0.06 mm. The ratio of the radial width G of the annular damping gap 9 to the internal radius $R_2$ of the main tube 3, $((R_2-R_1)/R_2)$, amounts about 0.5%. The radial distance, $A=R_2-R_3$, of the annular space 121 amounts to approximately 2.06 mm. The ratio of the radial distance A of the annular space 121 to the internal radius $R_2$ of the main tube 3, $((R_2-R_3)/R_2)$, amounts about 17.08%.

Obviously the shape and the size of the annular damping gap 9 and the annular space 121 provide tuning parameters that may be used to reduce the amplitude and frequency of the rebound deflective disc 711 oscillations.

Figure 4:
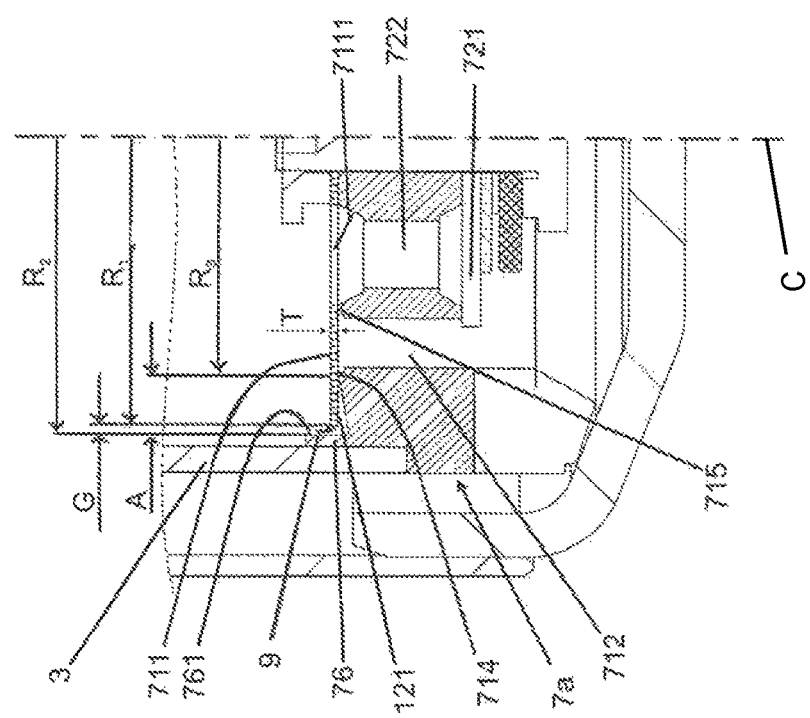
FIG. 4 is an enlarged cross-sectional view of another embodiment of the base valve assembly.

Alternatively, another embodiment of a base valve 7 is shown in FIG. 4. The body 73 of the base valve 7 includes an internal annular projection 76 disposed adjacent to the main tube 3 and extending radially outwardly from the body 73 presenting a circumferential damping surface 761. The rebound deflective disc 711 having an external circumferential surface spaced from the internal annular projection 76 and at least partially surround by the circumferential damping surface defining an annular damping gap 9. The annular damping gap 9 extends about the center axis C and has a radial width G between the external circumferential surface and the circumferential damping surface of the internal annular projection 76 whereby a ratio of the radial width G of the annular damping gap 9 to the internal radius $R_2$ of the main tube 3 is less than 10%.

The twin-tube hydraulic damper assembly 1 according to the present invention has been examined in tests involving measuring the acceleration of the piston rod 5 undergoing sinusoidal excitation. Measurements have been analyzed in a time domain and transformed to a frequency domain using Fast Fourier Transformation (FFT).

Figure 5:
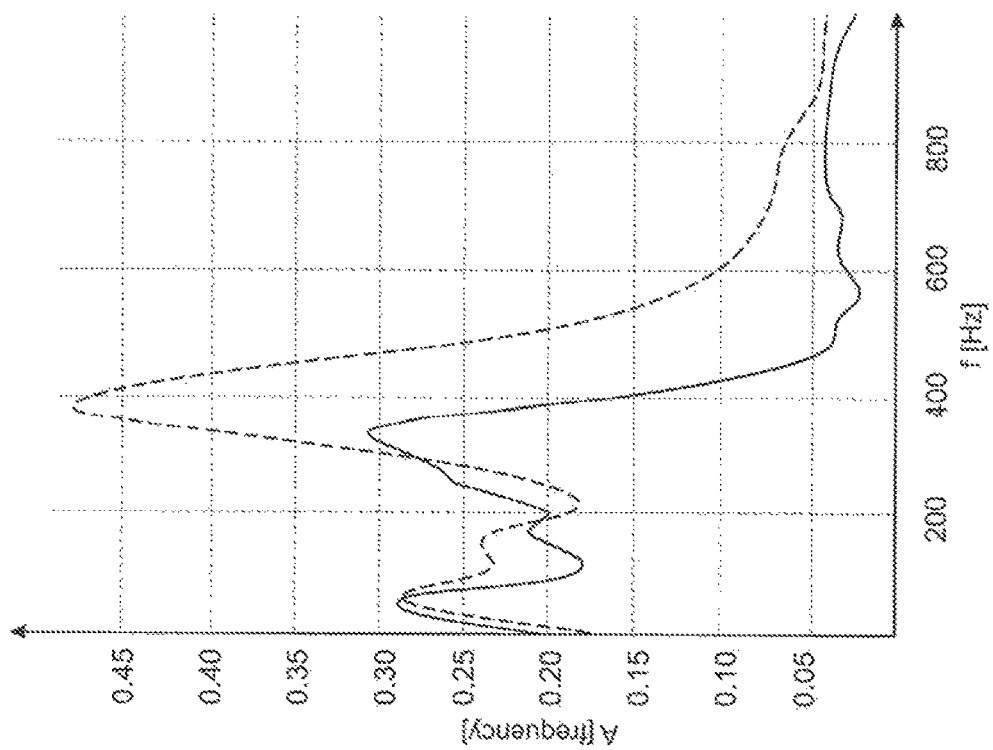
FIG. 5 is a graph illustrating piston rod acceleration amplitude vs. piston rod vibrations frequency of the twin-tube hydraulic damper shown in FIG. 1 as compared to a typical damper.

FIG. 5 shows frequency characteristics of the piston rod acceleration amplitude vs. piston rod acceleration frequency for the twin-tube hydraulic damper assembly 1 described above with reference to FIGS. 1-3 (solid line) as compared to a typical damper (dashed line). As shown, the presence of the annular damping gap 9 reduces the acceleration amplitude by approximately 39%. It should be appreciated that acceleration amplitude of higher Root Mean Square (RMS) value corresponds to higher energy that is transformed to a vehicle chassis.

The tests proved that the annular damping gap according to the present invention, provides a significant reduction of
- the maximal acceleration amplitude up to approximately 40%;
- the RMS acceleration values within the 200-600 Hz frequency range (that is the frequency range in which the most irritating rattling noise occurs) up to 50%;
- the vibration frequency by around 13.5%;

over the similar damper devoid of the annular damping gap and consequently the rattling noise produced during high frequency damper stroke reversals is significantly decreased.

In another embodiment of the present invention the rebound deflective disc 711 of the base valve 7 may be provided with equiangularly spaced radial circumferential arched projections defining the annular damping gap 9 over 30% of the circumference of the disc 711. In yet another embodiment of the present invention the circumferential damping surface 761 may be composed of a number of separate sections spaced equiangularly around the rebound deflective disc 711 and forming separate sections of the annular damping gap 9 extending over 30% of the disc 711 circumference.

The above embodiments of the present invention are thus merely exemplary. The figures are not necessarily to scale, and some features may be exaggerated or minimized. These and other factors however should not be considered as limiting the spirit of the invention, the intended scope of protection of which is indicated in appended claims.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A twin-tube hydraulic damper assembly comprising;
  a main tube disposed on a center axis and defining a fluid chamber having an internal radius extending along said center axis between a first end and a second end for containing a working liquid,
  a piston slidably disposed in said fluid chamber and movable along said center axis dividing said fluid chamber into a compression chamber and a rebound chamber,
  an external tube disposed on said center axis extending about said main tube defining an compensation chamber between said main tube and said external tube,
  a piston rod guide attached to said first end of said main tube and said external tube to close said rebound chamber,
  a piston rod extending along said center axis through said piston rod guide and attached to said piston for moving said piston along said center axis between a compression stroke with said piston moving away from said piston rod guide and a rebound stroke with said piston moving toward said piston rod guide,
  a base valve attached to said second end of said main tube and in communication with said fluid chamber and said compensation chamber for controlling the flow of the working liquid from said fluid chamber to said compensation chamber during said compression stroke and said rebound stroke, said base valve including a body defining at least one rebound flow channel and at least one compression flow channel extending through said body and spaced from one another allowing the working fluid to flow through the body during said rebound stroke and said compression stroke, a rebound valve of at least one rebound deflective disc having a thickness disposed on said center axis in said compression chamber and adjacent to said body to cover said at least one rebound flow channel and a compression valve of at least one compression deflective disc disposed on said center axis in said compensation chamber and adjacent to said body to cover said at least one compression flow channel, said rebound deflective disc having an external circumferential surface spaced from said main tube defining an annular damping gap extending about said center axis and having a radial width between said external circumferential surface and said main tube whereby a ratio of said radial width of said annular damping gap to said internal radius of said main tube is less than 10%, and said body of said base valve including an annular protrusion disposed between said rebound deflective disc and said body and extending outwardly from said body spaced from said main tube to receive said rebound deflective disc and defining an annular space between a radially external side of said annular protrusion and said rebound deflective disc and an internal surface of said main tube and extending about said center axis and having a radial distance between said main tube and said annular protrusion.

2. The twin-tube hydraulic damper assembly according to claim 1 wherein a ratio of said radial distance of said annular space to said internal radius of said main tube is less than 40%.

3. The twin-tube hydraulic damper assembly according to claim 1 wherein said radial width of said annular damping gap amounts to no more than 0.5 mm.

4. The twin-tube hydraulic damper assembly according to claim 1 wherein said radial width of said annular damping gap is less than said thickness of said rebound deflective disc.

5. The twin-tube hydraulic damper assembly according to claim 1 wherein said base valve includes a plurality of rebound flow channels disposed about said center axis and spaced equiangularly from one another.

6. The twin-tube hydraulic damper assembly according to claim 5 wherein said base valve includes a plurality of compression flow channels spaced from said plurality of rebound flow channels disposed about said center axis and spaced equiangularly from one another.

7. The twin-tube hydraulic damper assembly according to claim 6 wherein said rebound deflective disc defines a pair of openings each having a kidney-shape spaced from one another in communication with the compression flow channels allowing the working fluid to flow through the rebound valve.

8. A twin-tube hydraulic damper assembly comprising:

a main tube disposed on a center axis and defining a fluid chamber having an internal radius extending along said center axis between a first end and a second end for containing a working liquid, a piston slidably disposed in said fluid chamber and movable along said center axis dividing said fluid chamber into a compression chamber and a rebound chamber, an external tube disposed on said center axis extending about said main tube defining an compensation chamber between said main tube and said external tube, a piston rod guide attached to said first end of said main tube and said external tube to close said rebound chamber, a piston rod extending along said center axis through said piston rod guide and attached to said piston for moving said piston along said center axis between a compression stroke with said piston moving away from said piston rod guide and a rebound stroke with said piston moving toward said piston rod guide, a base valve attached to said second end of said main tube and in communication with said fluid chamber and said compensation chamber for controlling the flow of the working liquid from said fluid chamber to said compensation chamber during said compression stroke and said rebound stroke, said base valve including a body defining at least one rebound flow channel and at least one compression flow channel extending through said body and spaced from one another allowing the working fluid to flow through the body during said rebound stroke and said compression stroke, a rebound valve of at least one rebound deflective disc having a thickness and a circumference disposed on said center axis in said compression chamber and adjacent to said body to cover said at least one rebound flow channel and a compression valve of at least one compression deflective disc disposed on said center axis in said compensation chamber and adjacent to said body to cover said at least one compression flow channel, said body of said base valve including an internal annular projection disposed in said compression chamber adjacent to said main tube and extending radially outwardly from said body presenting a circumferential damping surface, said rebound deflective disc having an external circumferential surface spaced from said internal annular projection and at least partially surrounded by said circumferential damping surface defining an annular damping gap extending about said center axis and having a radial width between said external circumferential surface and said internal annular projection whereby a ratio of said radial width of said annular damping gap to said internal radius of said main tube is less than 10%, and said body of said base valve including an annular protrusion disposed between said rebound deflective disc and said body and extending outwardly from said body spaced from said main tube to receive said rebound deflective disc and defining an annular space between said annular protrusion and said rebound deflective disc and said external circumferential surface and extending about said center axis and having a radial distance between said main tube and said annular protrusion.

9. The twin-tube hydraulic damper assembly according to claim 8 wherein said circumferential damping surface surrounds at least 30% of said circumference of said rebound deflective disc.

10. The twin-tube hydraulic damper assembly according to claim 8 wherein a ratio of said radial distance of said annular space to said internal radius of said main tube is less than 40%.

11. The twin-tube hydraulic damper assembly according to claim 8 wherein said radial width of said annular damping gap amounts to no more than 0.5 mm.

12. The twin-tube hydraulic damper assembly according to claim 8 wherein said radial width of said annular damping gap is less than said thickness of said rebound deflective disc.

13. The twin-tube hydraulic damper assembly according to claim 8 wherein said base valve includes a plurality of rebound flow channels disposed about said center axis and spaced equiangularly from one another.

14. The twin-tube hydraulic damper assembly according to claim 13 wherein said base valve includes a plurality of compression flow channels spaced from said plurality of rebound flow channels disposed about said center axis and spaced equiangularly from one another.

15. The twin-tube hydraulic damper assembly according to claim 14 wherein said rebound deflective disc defines a pair of openings each having a kidney-shaped spaced from one another in communication with the compression flow channels allowing the working fluid to flow through the rebound valve.

16. A twin-tube hydraulic damper assembly comprising;
a main tube disposed on a center axis and defining a fluid chamber extending along said center axis between a first end and a second end for containing a working liquid,
an external tube disposed about said main tube defining an compensation chamber between said main tube and said external tube,
a piston slidably disposed in said fluid chamber dividing said fluid chamber into a compression chamber and a rebound chamber,
a piston rod extending along said center axis and attached to said piston for moving said piston along said center axis between a compression stroke and a rebound stroke,
a base valve attached to said second end of said main tube and in communication with said fluid chamber and said compensation chamber for controlling the flow of the working liquid from said fluid chamber to said compensation chamber during said compression stroke and said rebound stroke,
said base valve including a body defining at least one rebound flow channel extending through said body allowing the working fluid to flow through the body during said rebound stroke,
a rebound valve of at least one rebound deflective disc disposed on said center axis in said compression chamber and adjacent to said body to cover said at least one rebound flow channel,
said rebound deflective disc having an external circumferential surface spaced from said main tube defining an annular damping gap extending about said center axis and having a radial width between said external circumferential surface and said main tube, and
said body of said base valve including an annular protrusion disposed between said rebound deflective disc and said body and extending outwardly from said body spaced from said main tube to receive said rebound deflective disc and defining an annular space between said annular protrusion and said rebound deflective disc and said external circumferential surface and extending about said center axis and having a radial distance between said main tube and said annular protrusion.

17. The twin-tube hydraulic damper assembly according to claim 16 wherein a ratio of said radial width of said annular damping gap to said internal radius of said main tube is less than 10%.

18. The twin-tube hydraulic damper assembly according to claim 16 wherein a ratio of said radial distance of said annular space to an internal radius of said main tube is less than 40%.

* * * * *